(12) United States Patent
Van Den Engel

(10) Patent No.: US 8,062,136 B2
(45) Date of Patent: Nov. 22, 2011

(54) OVERLOAD PROTECTION FOR AN AGRICULTURAL MACHINE

(75) Inventor: Alfonsus Jacobus Van Den Engel, Schiedam (NL)

(73) Assignee: Lely Patent N.V., Maassluis (NL)

( * ) Notice: Subject to any disclaimer, the term of this patent is extended or adjusted under 35 U.S.C. 154(b) by 19 days.

(21) Appl. No.: 12/565,851

(22) Filed: Sep. 24, 2009

(65) Prior Publication Data
US 2010/0071331 A1    Mar. 25, 2010

(30) Foreign Application Priority Data

Sep. 24, 2008 (NL) .................................. 1035973

(51) Int. Cl.
*F16D 7/02* (2006.01)
(52) U.S. Cl. ............................................. 464/41; 464/48
(58) Field of Classification Search .............. 464/48, 464/41, 10, 17, 37; 192/56.6, 56.1, 70.12, 192/113.31; 56/11.3, 11.2, 10.3, 367
See application file for complete search history.

(56) References Cited

U.S. PATENT DOCUMENTS

| | | | | |
|---|---|---|---|---|
| 2,618,136 A | * | 11/1952 | Wellauer | 464/48 |
| 3,100,974 A | * | 8/1963 | Wilson et al. | 464/46 |
| 3,488,980 A | * | 1/1970 | Burrough | 464/25 |
| 3,600,877 A | * | 8/1971 | McCrary et al. | 56/10.3 |
| 4,401,426 A | * | 8/1983 | Heidenreich | 464/41 |
| 4,645,472 A | * | 2/1987 | Heidenreich | 464/48 |
| 5,129,497 A | * | 7/1992 | Kelley | 464/10 |
| 6,447,397 B1 | * | 9/2002 | Jaeger et al. | 464/37 |
| 6,470,658 B1 | * | 10/2002 | Wubbels | 56/11.7 |
| 6,502,377 B2 | * | 1/2003 | Kraus | 56/6 |
| 6,699,130 B2 | * | 3/2004 | Wubbels | 464/17 |
| 6,902,485 B2 | * | 6/2005 | Wubbels | 464/17 |
| 7,640,718 B2 | * | 1/2010 | Altepost et al. | 56/11.2 |
| 2002/0157363 A1 | | 10/2002 | Kraus | |

FOREIGN PATENT DOCUMENTS

| | | |
|---|---|---|
| DE | 2407821 A1 | 9/1975 |
| DE | 202007008591 U1 | 9/2007 |
| EP | 1258187 A2 | 11/2002 |

* cited by examiner

*Primary Examiner* — Arpad Fabian-Kovacs
(74) *Attorney, Agent, or Firm* — Coraline J. Haitjema; David P. Owen; Hoyng Monegier LLP

(57) ABSTRACT

An agricultural machine, comprises a frame, two or more processing members, which are movably attached to the frame, and a drive device which is configured to drive the processing members. The drive device comprises a main drive shaft, two drive sections connected to the main drive shaft, which drive sections are each configured to drive one or more of the two or more processing members, wherein each drive section comprises a drive shaft. The drive device further comprises a protective device which enables a certain angular rotation between the two drive shafts in the case of an overload of one of the two drive shafts, and a coupling brake device which is configured to effect, at the angular rotation between the two drive shafts, a coupling between the other drive shaft and a part of the agricultural machine that is not co-rotatable with the two drive shafts.

20 Claims, 6 Drawing Sheets

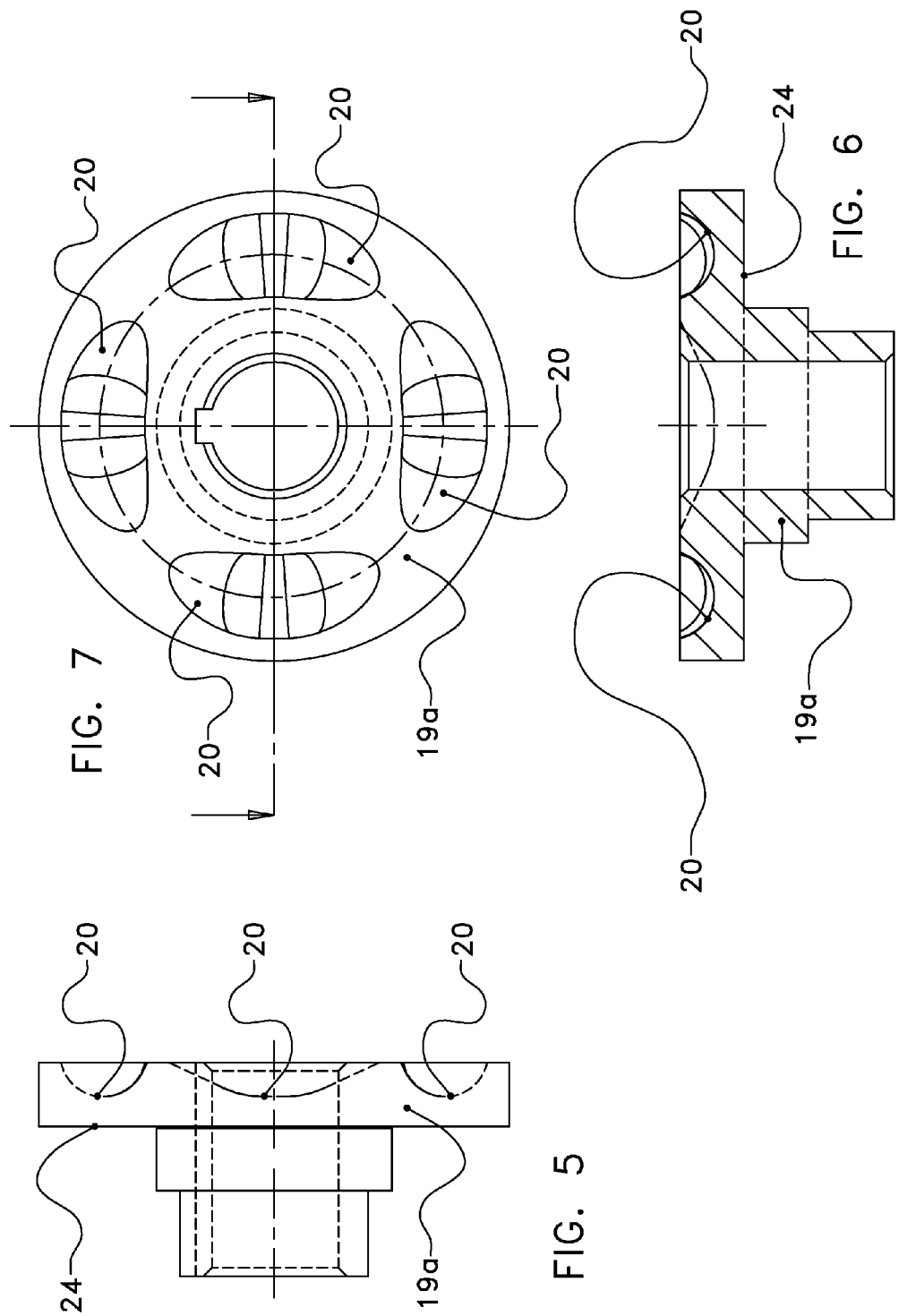

OVERLOAD PROTECTION FOR AN AGRICULTURAL MACHINE

CROSS REFERENCE TO RELATED APPLICATIONS

This application claims priority from Dutch application number 1035973 filed on 24 Sep. 2008, the contents of which are hereby incorporated by reference in their entirety.

BACKGROUND OF THE INVENTION

1. Field of the Invention

The invention relates generally to agricultural machines, in particular agricultural machines having driven processing members such as mowers, tedders or rotary harrows. The invention further relates to a method of overload protection for such machines.

2. Description of the Related Art

In general, in agriculture there is a trend to enlarge the machines in use in order thus to enable more efficient agricultural operation on a piece of land. With agricultural machines comprising rotating processing members this leads typically to an increasingly larger working width, and an increasing number of processing members being arranged in one row.

During processing ground or a crop which is lying on the ground it is possible that one of the processing members becomes stuck on an obstacle, for example a pole, tree or large stone. It will then suddenly no longer be possible for the processing member in question to rotate, while it is still being driven by the associated drive shaft. As a result thereof, the load which is exerted on the drive mechanism of the agricultural machine will suddenly increase quickly, resulting in a great risk of damage of the drive. In particular, there may be a great risk of the gear wheels of a transmission being damaged as a result of an overload.

It is known to place an overload protection on the main drive mechanism of a drive device in order to disconnect, in response to a suddenly increasing load, the drive mechanism from the driving source, for example the motor of a tractor, in order to limit the maximum load and thus to prevent damage of the drive mechanism.

However, in particular in the case of larger agricultural machines, in which a larger number of processing members should be driven simultaneously, the mass moment of inertia of the drive device and the processing members is accordingly greater. Suddenly stopping such a large mass which is interconnected via the drive mechanism may still provide a momentary load which may lead to damage of the drive mechanism. Moreover, an increased number of processing members also results in an increased total load which is required for driving all processing members. As a result, the components of the drive mechanism should be designed to be stronger.

In order to prevent the drive mechanism from being damaged, it could be possible, by means of an overload coupling, to disconnect only the blocked processing member from the drive mechanism at a too great load, so that the other processing members would be free to continue to rotate. However, this is only possible if the paths of movement of the processing members do not overlap. In a number of cases however, such as embodiments of mowers, tedders or rotary harrows, the paths of movement of the processing members overlap. For example, in the case of a specific type of tedder, each of the processing members may comprise arms with tines fastened thereto. The arms are arranged with respect to each other in such a manner that the arms of adjacent processing members rotate between each other. The processing members thus have overlapping paths of movement and should, therefore, be moved synchronously.

If, in such an agricultural machine, only the processing member which is suddenly blocked is disconnected, the arms of the adjacent processing member will run into the arms of the blocked processing member. This may lead to damage of the arms, for example serious deformation or breakage of the arms or the tines attached thereto. In such an agricultural machine, such a single disconnection of a single processing member is therefore unwanted.

EP 1 258 187 A2 discloses a drive mechanism for agricultural machines comprising a main drive shaft and two drive sections for driving a group of processing members. Each drive section comprises a drive shaft and an overload coupling which, in the case of an overload, falls back to a minimum torque value. The drive shafts are in line. A catching device is provided between the drive shafts. The catching device is a device to allow a maximum angular rotation between the two drive shafts and consequently the groups of processing members.

When one of the processing members is blocked by an obstacle, the group of processing members in question is completely blocked and disconnected from the drive mechanism by means of the overload coupling. However, the other group of processing members continues to rotate until the catching device does not allow further relative rotation because a maximum angular rotation has been reached. Consequently, the second group of processing members will also be blocked and the overload coupling present in this drive section will be disengaged. By using this drive mechanism, the processing members will not be stopped in one go, but in two phases.

A further advantage of the drive mechanism according to EP 1 258 187 A2 is that the load is distributed over the two drive sections, in which case there is provided for each drive section an overload coupling with a maximum load of 50% of the maximum load of the main drive shaft. However, as a result of the fact that the two drive shafts of the two drive sections are in operative connection with each other by means of the catching device, two peak loads will occur in the blocked drive section.

Thus, there is a particular need for an alternative drive mechanism for an agricultural machine, which reduces the risk of damage of the drive mechanism or processing members in the case of an overload of one or more of the processing members.

BRIEF SUMMARY OF THE INVENTION

The present invention addresses these problems by providing an agricultural machine, comprising: a frame, two or more processing members, movably attached to the frame, and a drive device configured to drive the processing members, wherein the drive device comprises: a main drive, two drive sections connected to the main drive, each configured to drive one or more of the two or more processing members, wherein each drive section comprises a drive shaft, a protective device which enables a defined angular rotation between the two drive shafts in the case of an overload of one of the two drive shafts, and a coupling brake device configured to effect, at the defined angular rotation, a coupling between the other drive shaft and a part of the agricultural machine that is not co-rotatable with the two drive shafts.

The drive mechanism according to the invention enables an angular rotation between the two drive shafts in the case of an overload of one of the drive shafts, i.e. that the load becomes higher than a maximum operative load level. The load level at which this happens is usually higher than the normal operative load of the drive shaft in question. It is possible that during normal use of the agricultural machine there already occurs an angular rotation between the two drive shafts, for example with flexible coupling elements in the drive mechanism, but this angular rotation is usually smaller than the angular rotation which occurs in the case of overload.

Subsequently, in the case of overload, the angular rotation between the two drive shafts, which are preferably in line, is used to slow down the not overloaded drive shaft. This slowing down is effected by creating, at the defined angular rotation, a coupling between the non-overloaded drive shaft and a part of the agricultural machine that is not co-rotatable with the drive shafts, for example the frame or a housing of the drive mechanism mounted on the frame.

This coupling can be effected in the manner of a clutch or brake by pushing a friction surface which co-rotates which the drive shaft against a friction surface which does not co-rotate with the drive shaft in question. In an alternative embodiment, there can be effected a positively locked coupling between the non-overloaded drive shaft and the part of the agricultural machine which is not capable of co-rotating with the drive shaft. For this purpose, there is provided a mechanism which, at the angular rotation, in the case of overload, brings the drive shaft from a clearance position in which the drive shaft can rotate freely, into a blocking position in which the drive shaft is coupled with a part of the agricultural machine which is not capable of co-rotating with the drive shaft and, as a result thereof, can no longer rotate freely with respect to the frame of the agricultural machine.

Through this coupling, the drive shaft which, initially, is not overloaded will also have a load which is higher than the maximum load level of the overload coupling and, as a result thereof, said drive shaft will also disengage.

Such a drive mechanism has the advantage that only a peak load will be exerted on the blocked drive section. The second drive section is slowed down by action against the frame. There is thus effected a disengagement of the drive of both drive sections without the risk of damage of the processing members resulting from asynchronous movement of the processing members of the different drive sections.

The drive mechanism has the additional advantage that the maximum load in each drive section is determined by the drive section itself, because the drive sections are not interconnected by means of a catching device or the like. It is thus possible to select a maximum load for each drive section by means of the overload coupling of the drive section in question. The maximum load per drive section can therefore differ to a considerable extent.

The defined angular rotation required for slowing down can, for example, be obtained by using a flexible coupling in the partial drive of the overloaded drive shaft, or an overload coupling. A flexible coupling is a coupling which, depending on the load, allows an angular rotation, for example by placing a torsion element in the drive mechanism.

An overload coupling disengages at least partially when the load comes above a certain level. This is, for example, a coupling which, in the case of a load above the maximum load, continuous to transfer a limited moment. Alternatively it may be a coupling which completely disengages in the case of overload, for example a coupling comprising elements which break in the case of load above a maximum load, for example breaking bolts, a cam switch coupling or a ratchet slip coupling. The advantage of an overload coupling is that the maximum load can be set individually for each drive section, for example 60 percent of the maximum output of the main drive shaft. It is then also possible to provide the different drive sections with different maximum loads, because the drive sections are disengaged.

In one embodiment, the overload coupling comprises a coupling which transfers the maximum load in the case of a load which is higher than the maximum load. Such a coupling does not fall back to a limit moment in the case of an overload, but the transferred moment remains equal to the moment in the case of a maximum load. Such an embodiment has the advantage that, if the sum of the maximum loads of the overload couplings of the different drive sections is larger than the maximum load of the main overload coupling in the drive shaft, the main overload coupling will also disengage in the case of overload of one of the drive sections.

An example of such a coupling is a friction coupling. A friction coupling comprises two coupling halves which are contiguous to each other and which transfer a moment by means of friction between the two coupling halves. The moment to be transferred is limited to a maximum moment. If one of the coupling halves is driven at a higher load than the maximum load, the coupling halves will slip with respect to each other, in which case a moment is transferred which is equal to the maximum moment.

If a friction coupling is overloaded, it may be desirable to bring the drive mechanism back into the initial position. For this purpose, each drive section may comprise a reset device which is configured to disengage, if desired, the drive section. Said reset device may comprise a clearance coupling which enables to rotate a drive section, in the direction opposite to the drive device, to the initial position. As an alternative, the reset device may be a disengaging device of the friction coupling itself, for example a hydraulic disengagement. It should be noted here that such reset devices can also be applied for other types of slip couplings.

Another overload coupling which, at a load higher than the maximum load, transfers the maximum load, is an overrun coupling with pretension force. This overload coupling too comprises two coupling halves which rotate with respect to each other in the case of an overload and then transfer a moment which is equal to the moment in the case of maximum not disengaged load.

In one embodiment, the coupling brake device comprises: a first brake portion which is mounted, rotationally fixed and movably in axial direction, on an end of the first drive shaft, a second brake portion which is mounted rotationally fixed on an end of the second drive shaft, a brake mechanism between the first and the second brake portion, which, at an angular rotation equal to or greater than the minimum angular rotation, pushes the first and the second brake portion away from each other, and a first abutment face which is not co-rotatable with the two drive shafts and against which the first brake portion can abut as a result of the first and the second brake portion being pushed away from each other.

In such an embodiment, at the defined angular rotation of the first drive shaft with respect to the second drive shaft, as a result of overload, the first and the second brake portion will be pushed away from each other, so that the first brake portion will abut against the abutment face. As a result, the brake portion will be blocked with respect to the abutment face which is not co-rotatable with the drive shaft. By this coupling between the not blocked drive shaft and the abutment face the load in the not blocked drive section will increase and disengage the overload coupling of the second drive section and/or a main overload coupling, so that the second drive section too will no longer be driven. As a result, both groups of processing members will no longer be driven and come to a standstill without the risk of damage as a result of the asynchronous rotation of the two groups.

In one embodiment, the second brake portion is mounted movably in axial direction on the second drive shaft, and there is provided a second abutment face which is not co-rotatable with the two drive shafts, against which the second brake portion can abut when the first and the second brake portion are pushed away from each other. By providing two brake portions which are axially movable with respect to the respective drive shaft, the slowing down force, which is obtained by pushing the first and the second brake portion away from each other and thus pushing the first and the second brake portion against the abutment faces, can be increased.

In one embodiment, a friction element, for example an annular friction element, can be provided between the brake portions and the respective abutment face.

In certain embodiments, the brake mechanism comprises one or more balls which are each mounted in oppositely located ball tracks in the first brake portion and the second brake portion, wherein the ball tracks have a decreasing depth when viewed from a nominal or equilibrium angular position of the first brake portion or the second brake portion, respectively. The nominal angular position is the position of the drive shafts with respect to each other in the unloaded condition with no relative angular rotation between the two drive shafts.

In the equilibrium angular position, the depth of the ball tracks can be selected in such a manner that the ball present in the ball tracks has some clearance between the two brake portions. If angular rotation occurs between the first and the second brake portion, the first and the second brake portion will rotate with respect to each other. As a result, other parts of the ball track will be positioned opposite each other. Since the depth of the ball tracks from the nominal angular position decreases, the ball will be clamped between the two brake portions, and at further angular rotation, the ball will push the two brake portions away from each other. At the overload angular rotation, the ball pushes the two brake portions away from each other to such an extent that the brake portion in question will be pushed against the abutment face. As a result, a coupling is effected between the not overloaded drive shaft and a part of the agricultural machine, for example the frame, which is not co-rotatable with the two drive shafts. This coupling is maintained until the angular rotation between the two drive shafts is smaller than the overload angular rotation.

It should be noted that the ball can be positioned in the nominal angular position in a manner in which it is clamped between the two brake portions, in which case, however, the brake portions do not yet abut against the one or more abutment faces.

In one embodiment, each ball track in the upwardly tapering part thereof has an effective angle with respect to the plane perpendicular to the longitudinal centre line of the respective drive shaft which is smaller than 30 degrees, for example 25 degrees. In a further embodiment, the ball track has around the nominal position a substantially flat part over an angle of not more than 20 degrees, preferably not more than 10 degrees, with respect to the centre line of the respective drive shaft.

In another embodiment, each of the ball tracks is bowl shaped and each ball track extends over an angle of 65 to 85 degrees with respect to the centre line of the respective drive shaft. While the use of a ball and track arrangement may be a preferred manner of indicating a relative rotation between two drive shafts, it will be understood that other alternative indicators of relative movement may be provided as well as other alternative elements for initiating a braking force on the not overloaded drive shaft.

In certain embodiments, the brake device may comprise one or more pretensioning elements to pretension the first and the second brake portion towards each other. By means of such pretensioning elements, for example spring elements or rings of flexible material, it can be prevented that in normal operation the brake portions come into contact with the abutment faces and thus cause unintended braking or coupling.

Another aspect of the invention comprises a coupling brake device for an agricultural machine having a drive device, the coupling brake device being configured to effect, in the case of a defined relative angular rotation between two drive shafts of the drive device as a result of an overload of one of the two drive shafts, a coupling between the other drive shaft and a component which is not co-rotatable with the two drive shafts, in order thus to limit the angular rotation between the two drive shafts. The brake device may be as described above or may be any other suitable arrangement capable of exerting a brake force on one of the drive sections or shafts in response to a relative rotation between the two drive shafts. In particular, friction braking devices acting on any part of the drive between an overload protection and a processing member.

According to a yet further aspect of the invention there is provided a method of protecting a drive device for two or more overlapping groups of processing members of an agricultural machine, comprising: providing a main drive mechanism and at least two drive sections, wherein each drive section has a drive shaft for driving one or more of the two or more processing members; providing an overload protection in the first and the second drive sections; in the case of overload of the first drive shaft, enabling an angular rotation of the first drive shaft with respect to the second drive shaft, and applying a braking force to the second drive shaft in response to a defined angular rotation.

BRIEF DESCRIPTION OF THE DRAWINGS

The features and advantages of the invention will be appreciated upon reference to the following drawings, in which:

FIGS. 5, 6 and 7 are a side view, a cross-sectional view and a second side view of a brake portion according to the invention.

DESCRIPTION OF ILLUSTRATIVE EMBODIMENTS

Figure 1:
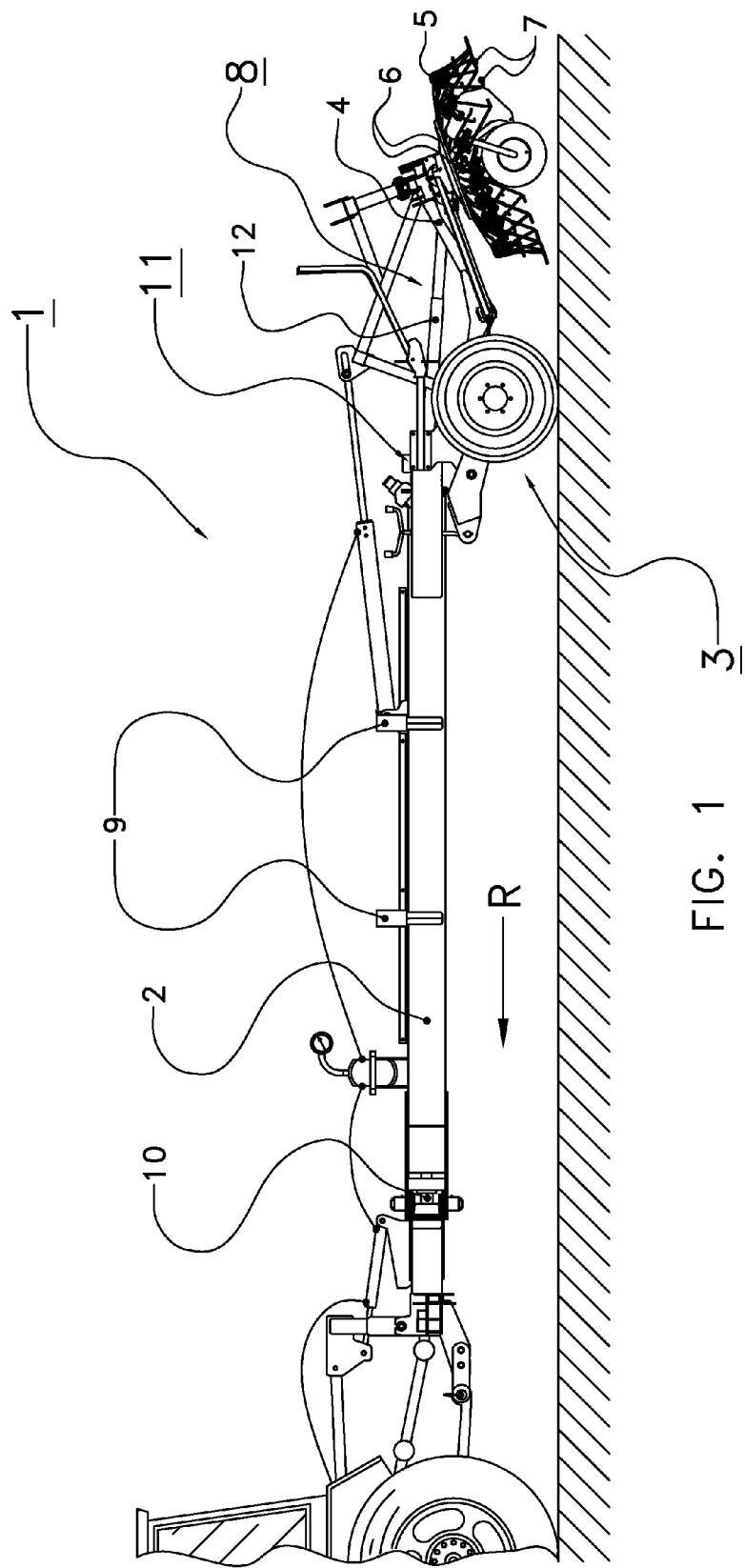
FIGS. 1 and 2 are a side view and a top view of an agricultural machine according to the invention.
Figure 2:
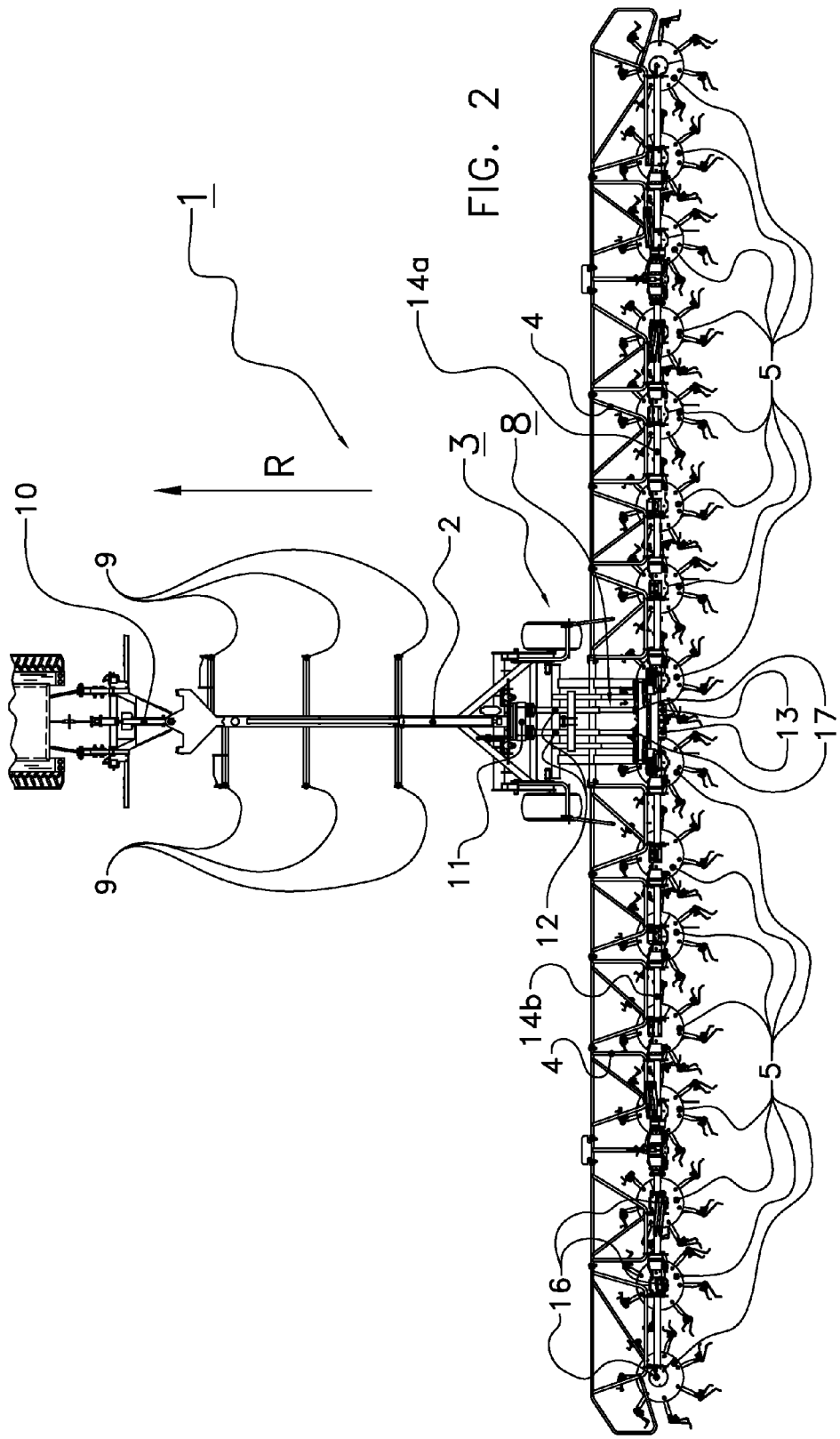

The following is a description of certain embodiments of the invention, given by way of example only and with reference to the drawings. FIGS. 1 and 2 show a tedder denoted as a whole by reference numeral 1. The tedder comprises a frame 2 comprising a front end which is configured to be coupled to a pulling vehicle in order to be moved in the direction of travel R. Near the rear end of the frame 2 there is provided a wheel set 3 to support the frame 2. At the rear end of the frame 2 there are mounted two carrier arms 4 which extend at opposite sides of the frame 2.

Figure 3:
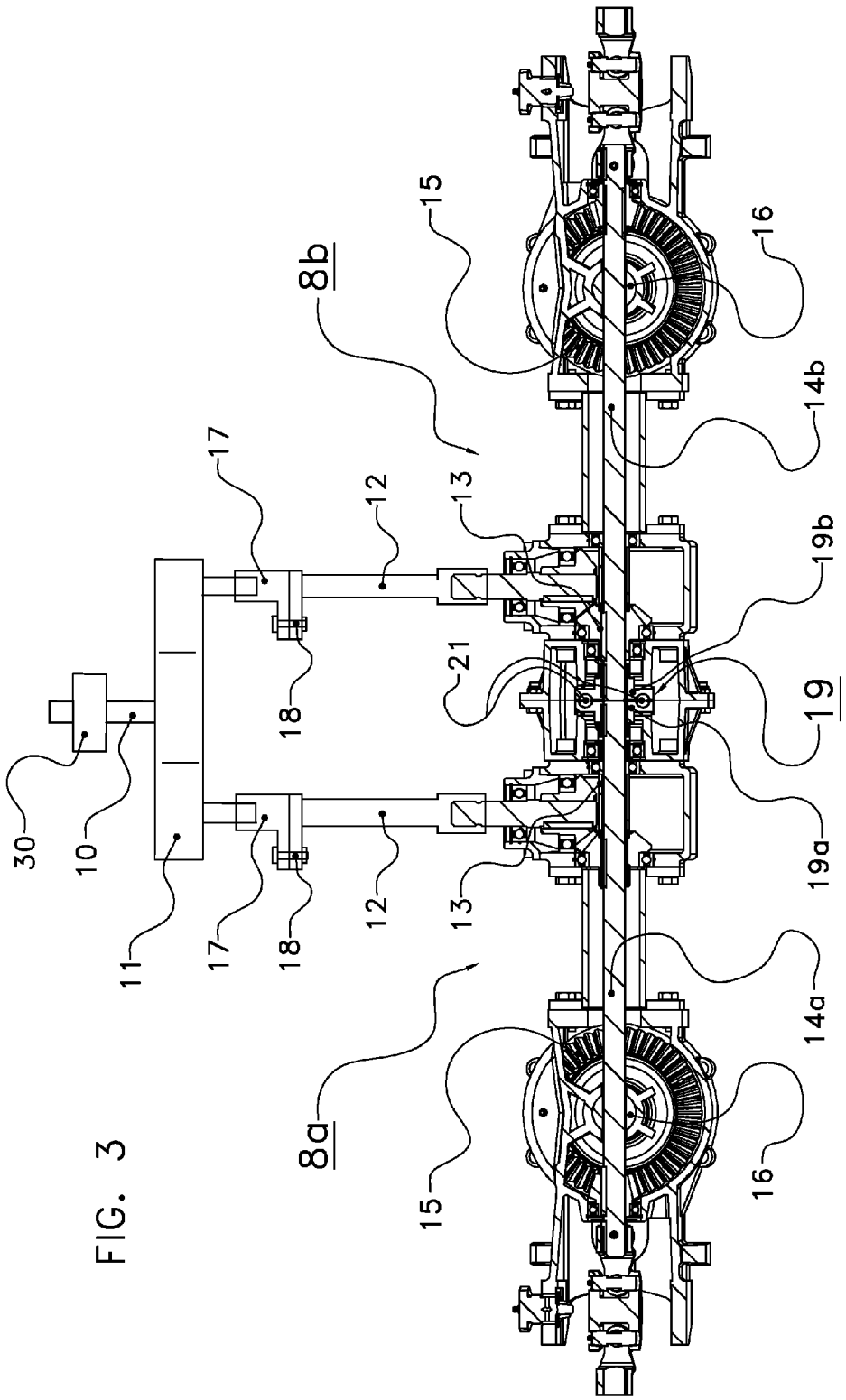
FIG. 3 is a schematic top view of the drive device of the agricultural machine of FIGS. 1 and 2.

Each of the carrier arms 4 supports eight rotatable processing members 5. The processing members 5 comprise a number of arms 6 having a number of tines 7. A drive mechanism 8, shown in more detail in FIG. 3, is provided for driving the processing members 5 in a rotating manner. The carrier arms 4 are configured to be folded up to a transport position in which the carrier arms 4 with processing members 5 will be positioned on the supports 9. There is provided a hydraulic circuit with actuators for folding in the carrier arms 4 to the transport position and folding them out to the operative position.

The drive mechanism 8 comprises a main drive shaft 10 which, at one end, is configured to be connected to a drive source, and which, at the other end, is connected to a gear box 11. In the main drive shaft there is provided a main overload coupling 30 which maximises the drive capacity of the entire drive mechanism 8. The gear box 11 is further operatively connected to two drive sections 8a, 8b which each comprise a drive shaft 14a, 14b. There are provided drive couplings 12 which, via a first transmission 13, are connected to a drive shaft 14a, 14b. Each drive shaft 14a, 14b comprises for each of the eight processing members 5 a second transmission 15 and a shaft 16 by means of which the processing member 5 in question is drivable in a rotating manner.

The processing members 5 rotate in overlapping paths of movement with respect to the adjacent processing members 5. The processing members 5 are driven in turn in opposite directions of rotation so that the arms 6 with tines 7 of different processing members 5 does not prevent each other from rotating.

Despite the overlapping paths of movement the processing members 5 do have a free angle of rotation, i.e. an angle over which a processing member 5 can rotate with respect to an adjacent processing member 5 without abutting against the adjacent processing member 5. Said free angle of rotation depends on the design of the processing members 5. In an embodiment of a tedder as shown in FIGS. 1 and 2, this free angle of rotation of the processing members 5 is between 5 degrees and 20 degrees, for example 10 degrees, in both directions. In another embodiment, the processing members are of a rotary harrow, where the rotary harrow has two arms per processing member, and the free angle of rotation can be maximally 90 degrees in both directions.

Since the second transmission 15 has a speed reduction of approximately a factor three of the drive shaft 14a, 14b to the shaft 16, a free angle of rotation of 10 degrees for the processing members 5 is a free angle of rotation of 30 degrees for the drive shafts 14 with respect to each other.

According to the invention it is possible to use this free rotation space to slow down a not overloaded drive section if the other drive section would be stopped as a result of overload. This makes it possible to prevent damage to the agricultural machine as a result of not synchronously moving processing members.

The drive device 8 comprises in each of the drive sections 8a, 8b an overload coupling 17. The overload coupling 17 comprises a breaking bolt 18 which breaks in the case of a load greater than the maximally desired operative load, as a result of which the drive shaft 14a, 14b in question is disconnected from the main drive shaft 10.

Each of the overload couplings 17 is set at a maximum operative load which is lower than the maximum load of the main overload coupling 30 in the main drive shaft 10. For example, the maximum load of each of the overload couplings 17 can be 17.55% to 75% of the maximum load of the main overload coupling 30 in the main drive shaft 10. This has the advantage that the maximum load of the components of the individual drive sections 8a, 8b is lower than the maximum load of the entire drive mechanism 8.

The drive device 8 further comprises a coupling brake device 19 comprising a first brake portion 19a and a second brake portion 19b.

Figure 4:
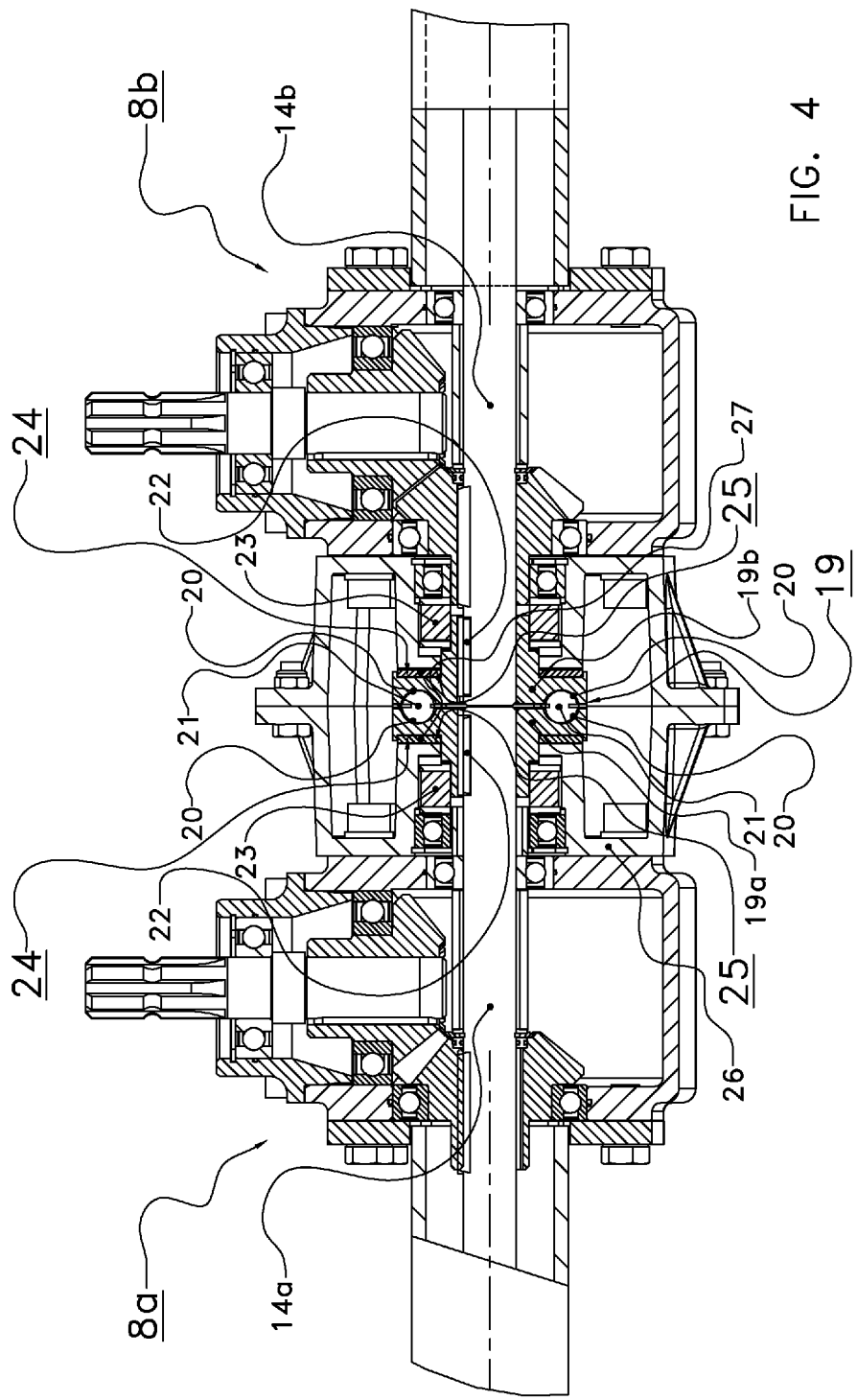
FIG. 4 is a schematic top view of the coupling brake device of FIG. 3.

FIG. 4 shows the coupling brake device 19 in more detail. The first brake portion 19a and the second brake portion 19b are each rotationally fixed by means of a key 22, but mounted movably in axial direction on the first drive shaft 14a, the second drive shaft 14b, respectively. In each of the circular surfaces located towards each other of the first brake portion 19a and the second brake portion 19b there are provided four bowl-shaped ball tracks 20 distributed over the circumference of the surfaces. The coupling brake device 19 further comprises four balls 21 which are provided in the oppositely located ball tracks 20.

In FIGS. 5, 6 and 7, the first brake portion 19a is shown in more detail. The second brake portion 19b is designed analogously.

With reference to FIG. 4, the two brake portions 19a, 19b are pretensioned towards each other by annular spring elements 23. As a result, the two surfaces facing each other of the first brake portion 19a and the second brake portion 19b will be closest possible to each other. In the nominal angular position of the first brake portion 19a and the second brake portion 19b, the bowl-shaped ball tracks 20 are located opposite each other and the distance between the bottoms of the ball tracks 20 is greater than the diameter of the ball 21.

The brake portions 19a and 19b each have an annular abutment face 24 which is located opposite annular abutment faces which are provided on a housing 26 of the drive mechanism 8. The housing 26 is rigidly connected to the frame 2 of the agricultural machine 1 and cannot rotate with the drive shafts 14a, 14b. Between the annular abutment faces 24 and 25 of the brake portions 19a, 19b, the housing 26, respectively, there are provided friction rings 27 of friction material to improve the braking function between the abutment faces 24 and 25. The friction rings 27 are loose elements. As an alternative, it is also possible to apply friction material on one of the abutment faces 24, 25 or both of them.

At an angular rotation between the first drive shaft 14a and the second drive shaft 14b and, consequently, between the first brake portion 19a and the second brake portion 19b, the bowl-shaped ball tracks 20 will move with respect to each other and the distance between the bottoms located opposite each other of the ball tracks 20 will decrease. As a result, the balls 21 will be clamped between the two brake portions 19a, 19b and at a further angular rotation the two brake portions 19a, 19b will be moved from each other by the balls 21 against pretension of the spring elements 23. As a result, the abutment faces 24, 25 will be pushed against the friction rings 27 so that there will be created a coupling between the brake portions 19a, 19b and the housing 26. This coupling will make it impossible for the brake portions 19a, 19b to rotate further with respect to each other.

An overload of the drive sections 8a, 8b is counterbalanced as follows by means of the above described drive device 8.

At a simultaneous overload of both drive sections 8a, 8b, the main overload coupling 30 will disengage so that both drive sections 8a, 8b will substantially synchronously come to a standstill.

If an overload occurs in one of the drive sections 8a, 8b, for example in the first drive section 8a, the overload coupling 17 in the drive section 8a concerned will disengage by breakage of the breaking bolt 18. As a result, the disengaged drive section 8a will no longer be driven by the main drive shaft 10, while the other drive section 8b is still being driven. This results in an angular rotation between the first brake portion 19a of the disengaged drive shaft 14a and the second brake portion 19b of the drive shaft 14b which is still being driven. By the angular rotation the two brake portions 19a, 19b will be pushed away from each other, as described above, so that each friction ring 27 will be clamped between the abutment faces 24 and 25. This results in a coupling between the drive shaft 14b of the second drive section 8b and the housing 26, and the load of the second drive section 8b will increase until it reaches the maximum load of the overload coupling 17 of the second drive section 8b and disengages same by breaking the breaking bolt 18. As a result, both drive sections 8a, 8b are disengaged from the main drive shaft 10.

Figure 8:
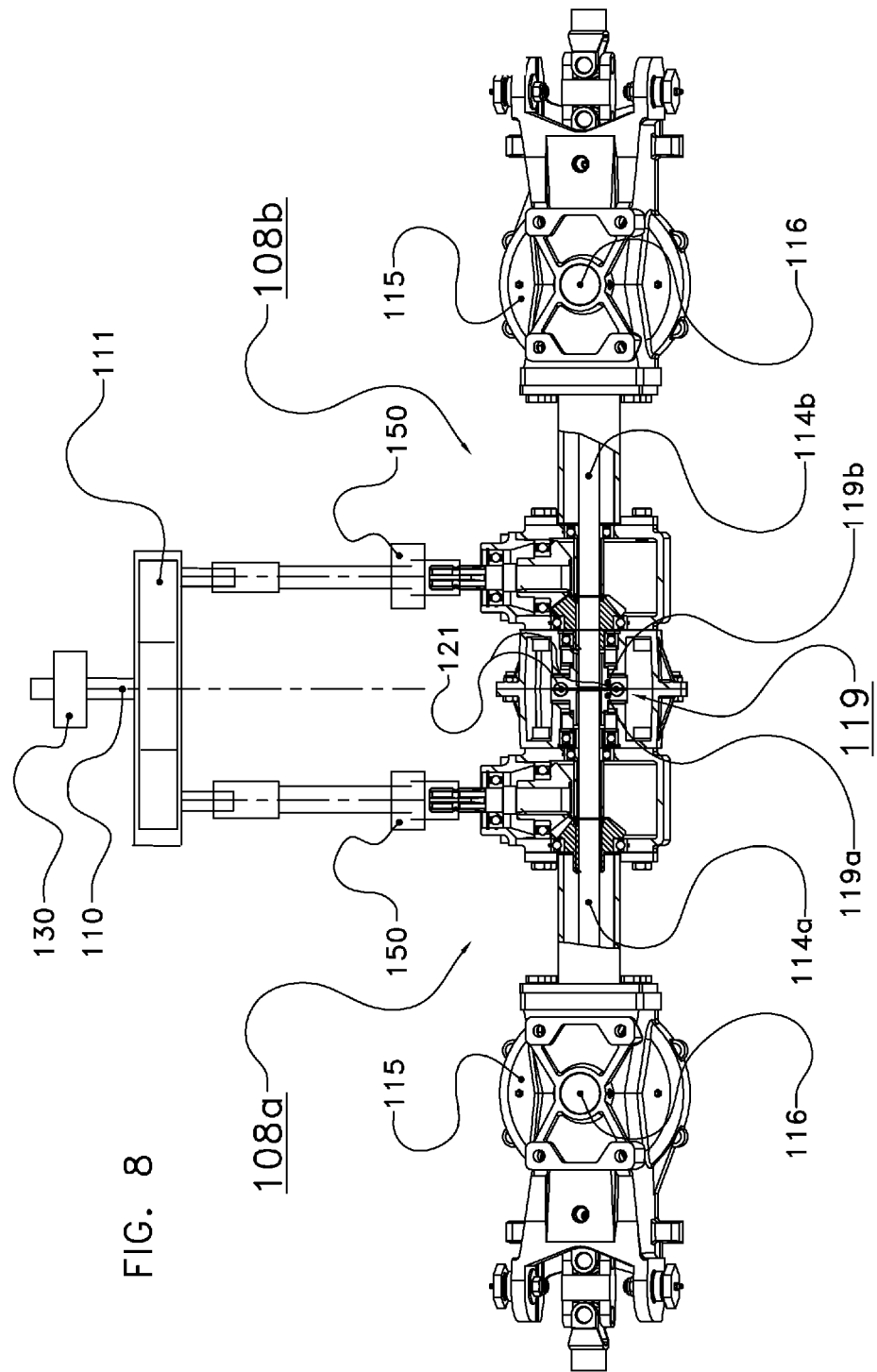
FIG. 8 is a schematic top view of an alternative drive device according to the invention.

FIG. 8 shows an alternative embodiment of a drive device 118 according to the invention.

Analogously to the drive device described above, the drive device 108 comprises a main drive shaft 110 which, at one end, is configured to be connected to a drive source, and which, at the other end, is connected to a gear box 111. In the main drive shaft there is provided a main overload coupling 130 which maximises the drive capacity of the entire drive mechanism 108. The gear box 111 is further operatively connected to two drive sections 108a, 108b which each comprise a drive shaft 114a, 114b. There are provided drive couplings 112 which, via a first transmission 13, are connected to a drive shaft 114a, 114b. Each drive shaft 114a, 114b comprises for each of the eight processing members 5 a second transmission 115 and a shaft 116 by means of which the processing member 5 in question is drivable in a rotating manner.

In order to effect, in the case of overload of one of the drive sections 108a, 108b, blockage of the other drive section 108b, 108a, there is provided a coupling brake device 119 according to the invention. Said coupling brake device 119 comprising brake portions 119a, 119b and balls 121 is designed analogously to the above described coupling brake device 19 and will not be explained here in further detail.

In order to achieve the angular rotation required for the operation of the coupling brake device 119, there is provided a flexible coupling 150 in each of the drive sections 108a, 108b. Such a flexible coupling 150, for example a torsion element, allows an angular rotation in a drive mechanism as a result of the load in said drive section 108a, 108b. Consequently, also in the case of normal load, the flexible coupling 150 will allow an angular rotation in the drive section. However, when use is made of corresponding flexible couplings 150 in both drive sections 108a, 108b, and the load on these drive sections 108a, 108b is substantially the same, the same angular rotation will occur in both flexible couplings 150. It is also possible that different loads will result in different angular rotations. The flexibility of the flexible couplings 150 is selected in such a manner that, in the case of a normal operative load, the angular rotation between the two drive shafts 114a, 114b will not become so great that the processing members 5 of the different drive sections 108a, 108b can touch each other.

However, in the case of overload of one of the drive sections 108a, 108b, the angular rotation between the first drive shaft 14a and the second drive shaft 14b do differ substantially. This difference in angular rotation is used, according to the invention, to couple the drive shaft of the not overloaded drive section to the frame of the agricultural machine by means of the coupling brake device 119.

Subsequently, the load in the drive section blocked by the coupling brake device 119 will increase. If the sum of the loads in both drive sections 108a, 108b becomes greater than the maximum load of the main overload coupling 130, the main overload coupling 130 will disengage, and the entire drive mechanism will no longer be driven.

It is possible to make the change in angular rotation of the flexible coupling dependent on the load level. In particular, it is possible to make the change in angular rotation small in the case of loads below the maximum load level of the drive section 108a, 108b in question, and to make the change in angular rotation great in the case of loads above the maximum load level of the drive section 108a, 108b in question. This makes it possible, when there is no overload, to prevent unintended coupling of the coupling brake device 119, while, in the case of overload, the coupling brake device 119 will quickly couple the not overloaded drive section to the housing 26 as a result of the angular rotation.

For the protective device, as an alternative for the overload coupling 17 of FIG. 3 comprising breaking bolts 18, or the flexible couplings 150 of FIG. 8, it is also possible to use other couplings, depending on the desired characteristics of the drive device.

It is, for example, possible to provide in each of the drive sections a coupling which transfers the maximum load in the case of a load higher than the maximum load. Such a coupling does not fall back to a rest moment in the case of an overload, but the transferred moment remains equal to the moment in the case of a maximum load. In such an embodiment, if the sum of the maximum loads of the maximum loads of the overload couplings of the different drive sections is larger than the maximum load of the main overload coupling in the drive shaft, the main overload coupling will also disengage in the case of overload of one of the drive sections. In such a case, the overload couplings of the drive sections will be overloaded only for a very short period of time.

An example of such a coupling is a friction coupling. A friction coupling comprises two coupling halves which are contiguous to each other and which transfer a moment by means of friction between the two coupling halves. The moment to be transferred is limited to a maximum moment. If one of the coupling halves is driven at a higher load than the maximum load, the coupling halves will slip with respect to each other, in which case a moment is transferred which is equal to the maximum moment.

If a friction coupling is overloaded, it may be desirable to bring the drive mechanism back into the initial position. For this purpose, each drive section may comprise a reset device which is configured to disengage, if desired, the drive section. Said reset device may comprise a clearance coupling which enables to rotate a drive section, in the direction opposite to the drive device, to the initial position. As an alternative, the reset device may be a disengaging device of the friction coupling itself, for example a hydraulic disengagement. It should be noted here that such reset devices can also be applied for other types of slip couplings.

In one embodiment, it is possible that, in the case of disengagement of the drive sections, the latter automatically move to the normal initial position under the influence of the spring elements 23 which are mounted in the coupling brake device. Said spring elements 23 can move the brake portions 19a, 19b to the nominal positions by pushing the brake portions towards each other. By this pushing, the balls 21 will bring the brake portions 19a, 19b back to the nominal position.

Another overload coupling which, in the case of a load higher than the maximum load, transfers the maximum load, is an overrun coupling with pretension force. This overload coupling too comprises two coupling halves which rotate with respect to each other in the case of an overload and then transfer a moment which is equal to the moment in the case of maximum not disengaged load.

Thus, the invention has been described by reference to certain embodiments discussed above. It will be recognized that these embodiments are susceptible to various modifications and alternative forms well known to those of skill in the art. Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. Agricultural machine, comprising:
   a frame,
   two or more processing members, movably attached to the frame, and
   a drive device configured to drive the processing members, wherein the drive device comprises:
      a main drive,
      two drive sections connected to the main drive, each configured to drive one or more of the two or more processing members, wherein each drive section comprises a drive shaft,
      a protective device which enables a defined angular rotation between the two drive shafts in the case of an overload of one of the two drive shafts, and
      a coupling brake device configured to effect, at the defined angular rotation, a coupling between the other drive shaft and a part of the agricultural machine that is not co-rotatable with the two drive shafts.

2. Agricultural machine according to claim 1, wherein the drive shafts are substantially aligned with one another.

3. Agricultural machine according to claim 1, wherein the protective device comprises an overload coupling.

4. Agricultural machine according to claim 3, wherein the protective device comprises an overload coupling in each of the drive sections.

5. Agricultural machine according to claim 3, wherein the overload coupling comprises a coupling which transfers the maximum load in the case of a load which is higher than the maximum load.

6. Agricultural machine according to claim 5, wherein at least one drive section comprises a reset device configured to disengage the drive section in such a manner that the drive section can be brought into a desired angular position with respect to the main drive shaft or other drive sections.

7. Agricultural machine according to claim 1, wherein the protective device comprises at least one flexible coupling which allows an angular rotation between the two drive shafts.

8. Agricultural machine according to one of claim 1, wherein the coupling brake device comprises:
   a first brake portion mounted, rotationally fixed and movably in axial direction, on an end of the first drive shaft,
   a second brake portion mounted rotationally fixed on an end of the second drive shaft,
   a brake mechanism between the first and the second brake portion, which, at the defined angular rotation, pushes the first and the second brake portion away from each other, and
   a first abutment face which is not co-rotatable with the two drive shafts and against which the first brake portion can abut as a result of the first and the second brake portion being pushed away from each other.

9. Agricultural machine according to claim 8, wherein the second brake portion is mounted movably in axial direction on the second drive shaft, and wherein there is provided a second abutment face which is not co-rotatable with the two drive shafts and against which the second brake portion can abut as a result of the first and the second brake portion being pushed away from each other.

10. Agricultural machine according to claim 8, wherein the brake mechanism comprises one or more balls which are mounted in oppositely located ball tracks in the first brake portion and the second brake portion, wherein the ball tracks have a decreasing depth when viewed from an equilibrium angular position of the first brake portion and the second brake portion, respectively.

11. Agricultural machine according to claim 10, wherein the ball tracks have an effective angle with respect to a plane perpendicular to the longitudinal centre line of the respective drive shaft, which effective angle is smaller than 30 degrees, preferably smaller than 15 degrees.

12. Agricultural machine according to claim 8, wherein the brake mechanism comprises cams that are upwardly tapering in tangential direction and are mounted on the first brake portion and the second brake portion, which cams co-operate with each other.

13. Agricultural machine according to claim 8, wherein the abutment faces or the faces co-operating therewith of the first brake portion and the second brake portion are provided with a layer of friction material.

14. Agricultural machine according to claim 8, wherein one or more friction elements are provided between the first brake portion and the first abutment face or the second brake portion and the second abutment face.

15. Agricultural machine according to claim 8, wherein the coupling brake device comprises one or more pretensioning elements to pretension the first brake portion and the second brake portion towards each other.

16. In an agricultural machine having a drive device, a coupling brake device configured to effect, in the case of a defined relative angular rotation between two drive shafts of the drive device as a result of an overload of one of the two drive shafts, a coupling between the other drive shaft and a component which is not co-rotatable with the two drive shafts, in order thus to limit the angular rotation between the two drive shafts.

17. The coupling brake device according to claim 16, wherein the coupling brake device comprises:
   a first brake portion mounted, rotationally fixed and movably in axial direction, on an end of the first drive shaft;
   a second brake portion mounted rotationally fixed on an end of the second drive shaft;
   a brake mechanism between the first and the second brake portion, which, at the defined relative angular rotation, pushes the first and the second brake portion away from each other, and
   a first abutment face which is not co-rotatable with the two drive shafts and against which the first brake portion can abut as a result of the first and the second brake portion being pushed away from each other.

18. Method of protecting a drive device for two or more overlapping groups of processing members of an agricultural machine, comprising:
   providing a main drive mechanism and at least two drive sections, wherein each drive section has a drive shaft for driving one or more of the two or more processing members;

providing an overload protection in the first and the second drive sections;

in the case of overload of the first drive shaft, enabling an angular rotation of the first drive shaft with respect to the second drive shaft, and in response to a defined value of the angular rotation, applying a braking force to the second drive shaft.

19. The method of claim 18, wherein the overload protection is adjusted to a load which is lower than a normal load of the main drive mechanism, but higher than a normal load of the respective drive section.

20. The method of claim 18, wherein the braking force is applied by coupling the second drive shaft to a part of the drive device that is not co-rotatable with the first or the second drive shaft.

* * * * *